United States Patent [19]

Newman

[11] Patent Number: 4,817,566
[45] Date of Patent: Apr. 4, 1989

[54] FOUR-STROKE CYCLE INDUCTION TUNED V-ENGINE WITH CENTRAL EXHAUST MANIFOLD

[75] Inventor: Neil A. Newman, Omro, Wis.

[73] Assignee: Brunswick Corporation, Skokie, Ill.

[21] Appl. No.: 118,863

[22] Filed: Nov. 9, 1987

[51] Int. Cl.$^4$ .............................................. F02B 75/18
[52] U.S. Cl. ................................ 123/52 MV; 123/547
[58] Field of Search .......... 123/52 M, 52 MB, 52 MC, 123/52 MV, 543, 547, 315

[56] References Cited

U.S. PATENT DOCUMENTS

| | | | |
|---|---|---|---|
| 1,862,723 | 6/1932 | Summers | 123/52 MV |
| 2,523,611 | 9/1950 | Clayton | 123/52 MV |
| 2,686,506 | 8/1954 | Carpentier et al. | 123/52 MV |
| 2,771,863 | 11/1956 | Porsche et al. | 123/52 MV |
| 3,969,893 | 7/1976 | Sakurai et al. | 123/52 MV |
| 4,184,462 | 1/1980 | Hale | 123/55 VS |
| 4,244,332 | 1/1981 | Kusche et al. | 123/59 B |
| 4,266,514 | 5/1981 | Tyner | 123/55 R |
| 4,346,676 | 8/1982 | Tyner | 123/41.74 |
| 4,513,698 | 4/1985 | Senga et al. | 123/52 MV |

FOREIGN PATENT DOCUMENTS

| | | | |
|---|---|---|---|
| 651848 | 2/1929 | France | 123/52 MV |
| 518518 | 2/1940 | United Kingdom | 123/52 MV |

OTHER PUBLICATIONS

"Plymouths with Ram Induction", 10/1959, p. 305.
"The Scientific Design of Exhaust and Intake Systems", Philip H. Smith, 1/1962, pp. 166–178.

Primary Examiner—David A. Okonsky
Attorney, Agent, or Firm—Robert C. Curfiss

[57] ABSTRACT

A V-type four-stroke cycle internal combustion engine is provided with an exhaust manifold disposed in the valley of the V-shaped engine. The exhaust from the cylinders passes through the cylinder heads to an exhaust collection cavity formed in the exhaust manifold. The manifold is provided with water jackets above and below the exhaust collecting cavity to cool exhaust collected therein. An air intake manifold is also provided in the valley of the V-shaped engine, located above and adjacent the exhaust manifold. The air intake manifold has a central cavity, with induction tubes extending from the manifold to outside the valley of the V-engine for introducing air to the cylinders therefrom. The induction tubes provide induction tuning to the engine, to increase the torque provided by the engine. The arrangement of the engine components provides compact packaging for a V-type engine.

20 Claims, 3 Drawing Sheets

4,817,566

FOUR-STROKE CYCLE INDUCTION TUNED V-ENGINE WITH CENTRAL EXHAUST MANIFOLD

BACKGROUND AND SUMMARY

This invention relates to a V-type internal combustion engine, and more particularly to a V-engine for use in a marine propulsion system.

In a marine propulsion system including an engine, a transmission, and a propeller, it has been found that providing an increase in engine torque in a certain range of engine rpm at rated horsepower significantly enhances boat performance due to the capacity of the propeller to absorb engine torque under extreme conditions. One method for providing additional torque to the propeller in the relevant range of engine rpm at rated horsepower to enhance boat performance has involved use of a torque converter in conjunction with the transmission between the engine and the propeller. However, adding a torque converter can increase the complexity and cost of the transmission, and may not be an entirely satisfactory means for providing such increased torque.

The present invention provides a means for increasing the torque produced by a V-type engine without adding a torque converter or otherwise modifying the marine transmission. In accordance with the invention, a V-engine for marine application comprises a pair of cylinder banks having a plurality of cylinders, with the banks being oppositely slanted with respect to each other to form a V-shaped engine configuration. The upper ends of each cylinder in the pair of cylinder banks have an intake port for receiving an air-fuel mixture and an exhaust port for exhausting spent gases from the cylinders. The intake ports of each cylinder receive the air-fuel mixture from a supply means furnishing the mixture from outside the valley of the V-shaped configuration, and the exhaust ports exhaust the spent gases toward the valley of the V-shaped configuration. In accordance with one embodiment of the invention, an exhaust collection means, such as an exhaust manifold, is disposed in the valley of the V-shaped engine adjacent the engine block for collecting exhaust gases exhausted from the cylinders through the exhaust ports. The supply means comprises induction means for introducing the air-fuel mixture to the intake ports from outside the valley of the V-shaped engine and, in a preferred embodiment, the induction means comprises a plurality of induction tubes supplying the air-fuel mixture to the intake ports. The induction tubes are connected at one end to the V-shaped engine for passing the air-fuel mixture to the intake ports, and are connected at their other end to an intake manifold. In the preferred embodiment, the intake manifold is disposed in the valley of the V-shaped engine, and is located adjacent the exhaust manifold. Heat from the exhaust gases contained in the exhaust manifold or the engine cooling water is used to pre-heat air supplied to the intake ports via the induction tubes to provide efficient low-speed operation of the boat. A single exhaust outlet is provided from the exhaust manifold to discharge exhaust gases from the manifold through the exhaust system.

With the above construction, the induction tubes passing the air-fuel mixture to the cylinders are designed to provide "ram" type induction to the cylinders. As is known, this type of induction increases the amount of air-fuel mixture passing to the cylinders and available for the combustion cycle. With proper design of the induction tubes, an increase in engine torque by such increase in the amount of air-fuel mixture available for combustion is provided in the appropriate range of engine rpm at rated horsepower to enhance boat performance.

A further advantage offered by this construction of the V-type engine is that separate exhaust manifolds, generally located on the sides of the engine, are eliminated. In the past, V-type engines used in marine propulsion applications have closely resembled engines used in automotive applications, wherein an intake manifold is provided in the valley of the V-shaped engine with exhaust manifolds on either side of the engine connected to the cylinder heads. However, in marine applications, the exhaust manifolds are usually water-jacketed so as to provide cooling of the exhaust prior to discharge through the exhaust system. Such water-jacketed manifolds are heavy and bulky and, suspended from the sides of the engine, create substantial stresses on the engine block. This form of V-type engine construction also increases the overall width of the engine package. By eliminating the side-mounted exhaust manifolds, the present invention provides an engine package significantly narrower than previous engines, and in which the overall efficiency of engine component placement is increased. A single, well supported exhaust manifold discharges exhaust through a single outlet, thus providing an advantageous exhaust system.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
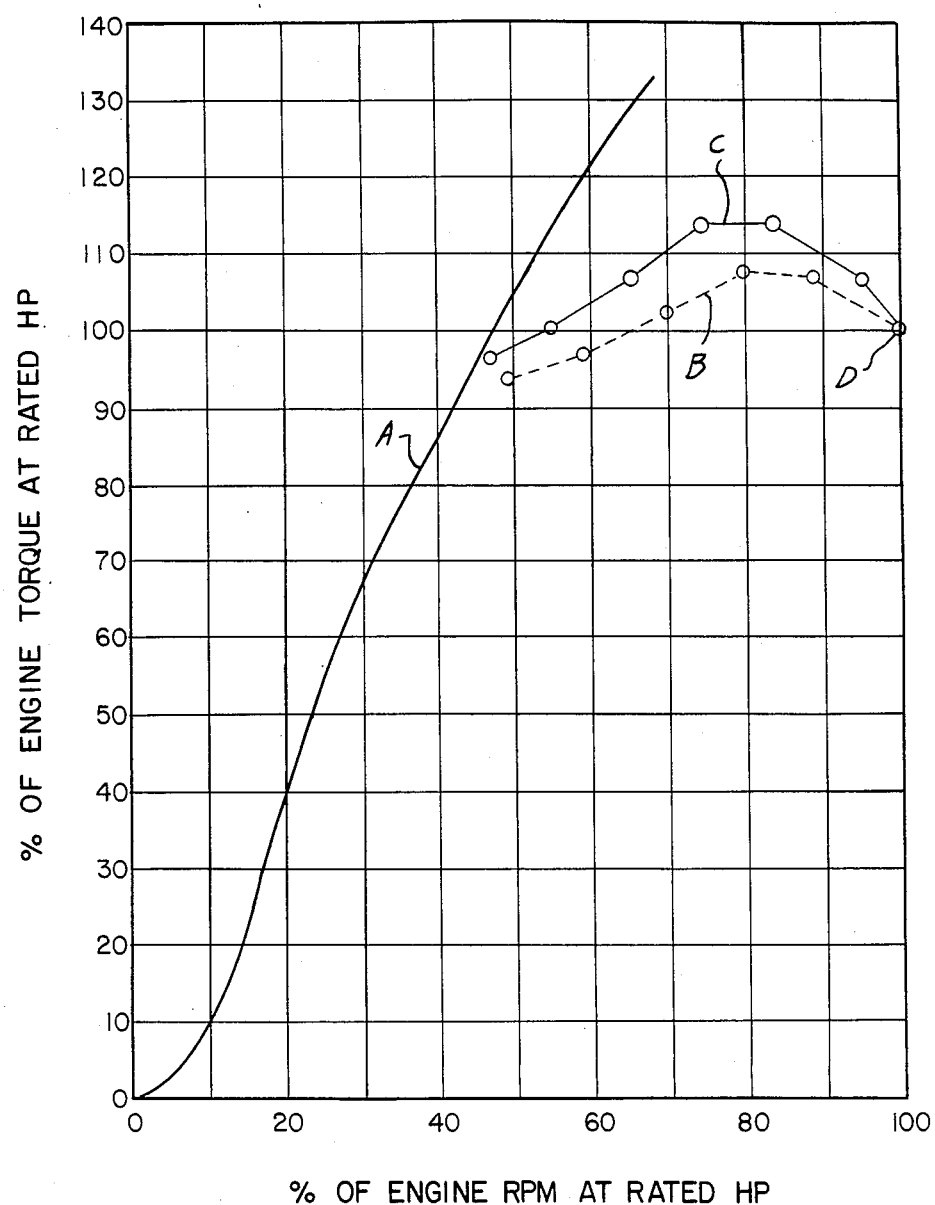
FIG. 1 is a graph showing demand of a marine propeller under extreme conditions for use in determining the appropriate range of engine rpm in which increased engine torque will result in increased boat performance.

As is well known, an inboard/outboard stern drive marine propulsion system includes a power plant such as an internal combustion engine, a transmission, and a propeller. In the graph of FIG. 1, the vertical axis represents the percent of engine torque at rated horsepower for a marine engine, and the horizontal axis represents percent of engine rpm at rated horsepower. Through experimentation, it has been determined that curve A represents the capacity of the propeller of the marine propulsion system to absorb engine torque under extreme conditions. The propeller can absorb engine torque in the area to the right of curve A, while torque in the area to the left of curve A cannot be absorbed.

Curve B shows experimental results of engine performance with an engine rated at 5000 rpm, and curve C shows experimental results of performance of the same engine at 5250 rpm. As can be seen, curves B and C terminate at their rightward end at a point D, representing 100% of engine rpm at rated horsepower and 100% of engine torque at rated horsepower.

It has been determined that increasing the area of the engine performance curve, such as curves B and C, between curve A and point D increases boat performance. Such increase in the area of the engine performance curve, and thereby boat performance, is the result of an increase in torque delivered to the propeller by the engine in the area of the graph in which the propeller can absorb the additional torque. In the curves shown in FIG. 1, boat performance with the engine rated at 5250 rpm, represented by curve C, is enhanced as compared to boat performance with the engine rated at 5000 rpm, represented by curve B.

Any method of providing increased torque to the propeller in the area to the right of curve A will result in enhanced boat performance. One way to increase torque in this area is to modify the transmission between the engine and propeller to provide such increased torque, such as by installing a torque-magnifying torque converter. In this manner, a conventional engine can be used, while nonetheless providing additional torque to the propeller. However, such an installation is relatively complicated and costly. The engine of the present invention avoids use of auxiliary torque-boosting mechanisms while at the same time providing an increase in torque in the area to the right of curve A. A standard or conventional marine transmission can be used with the engine so provided.

Figure 2:
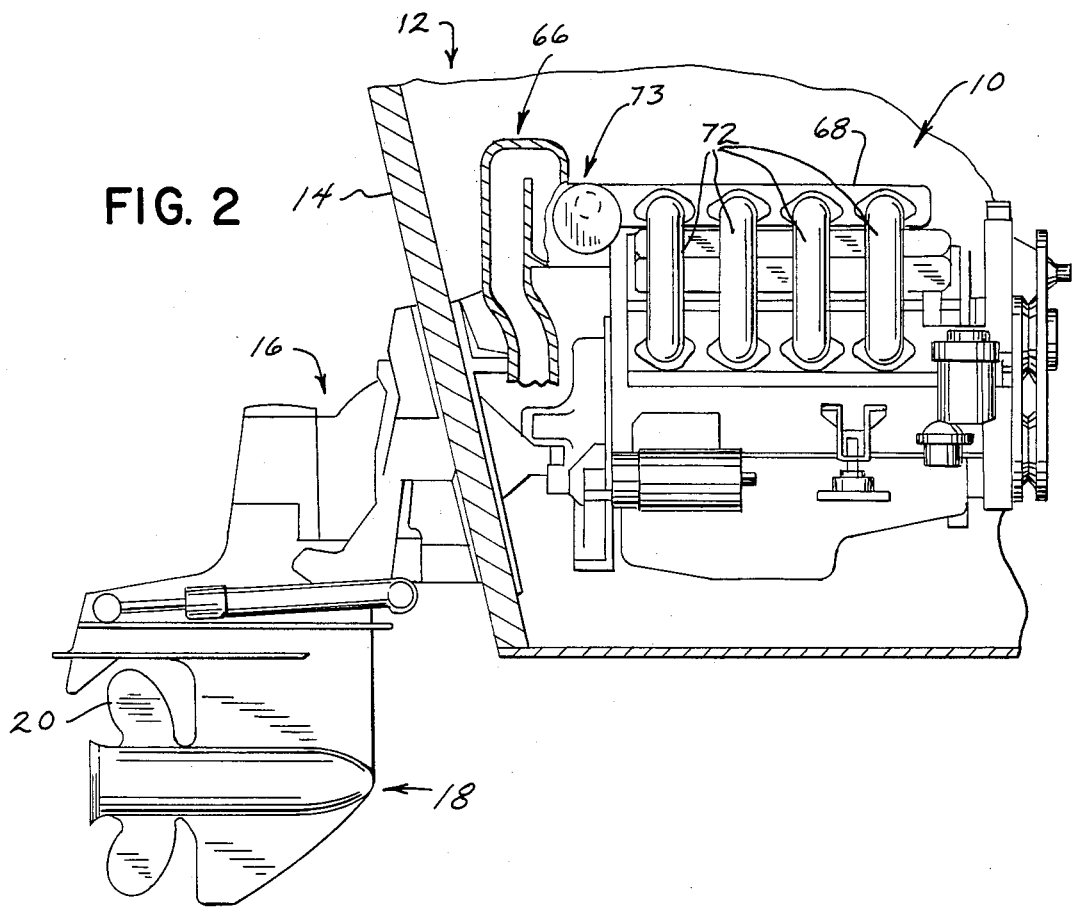
FIG. 2 is a side elevation view of an inboard/outboard marine stern drive propulsion system utilizing a V-type engine constructed according to the present invention.
Figure 3:
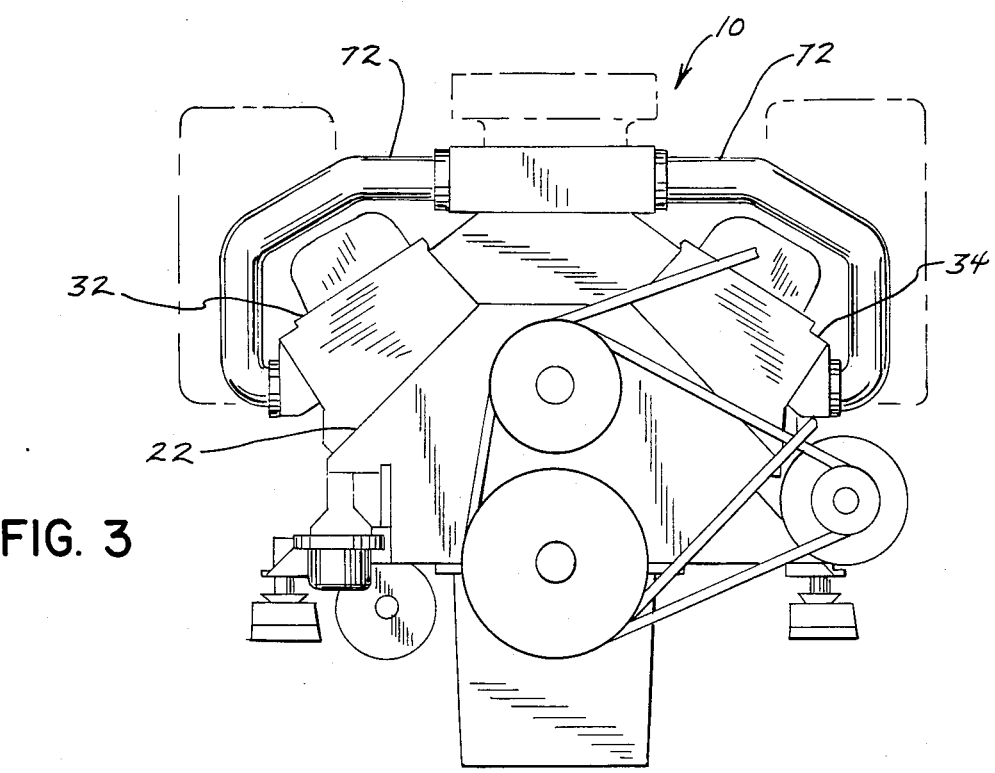
FIG. 3 is front elevation view of the marine engine of FIG. 2.
Figure 4:
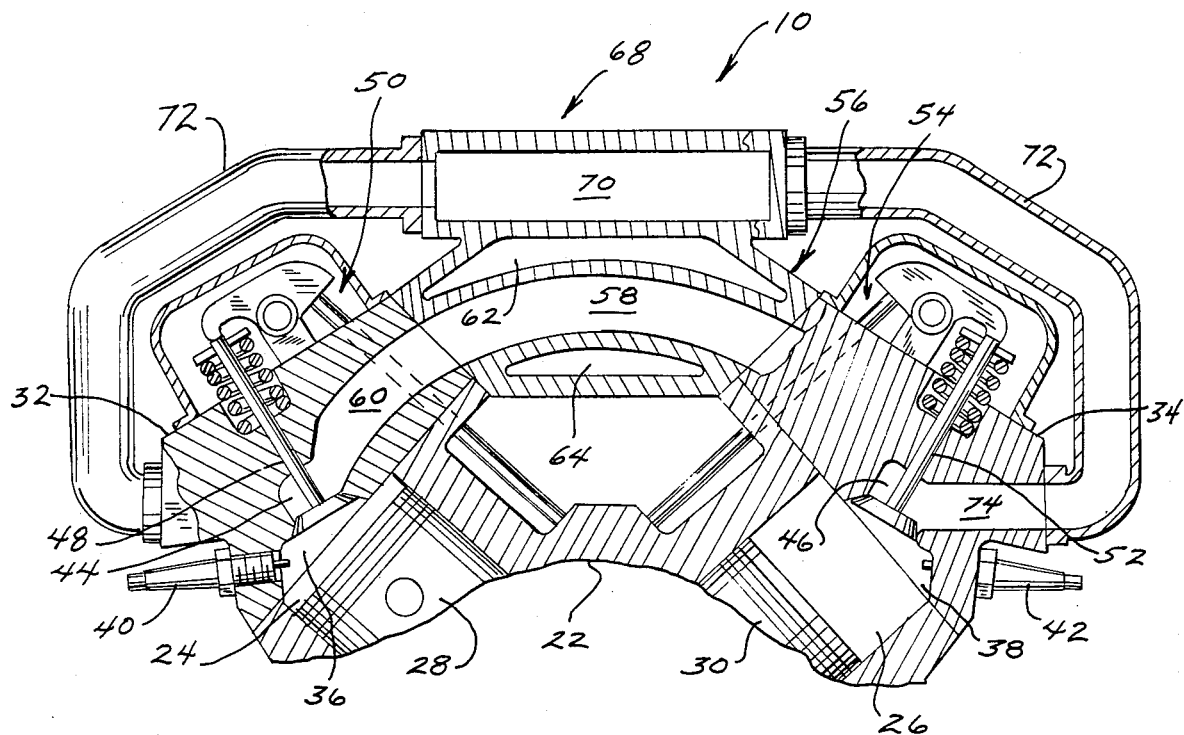
FIG. 4 is a sectional view similar to FIG. 3, showing the internal components and construction of the marine engine of the present invention.

The engine which has been developed to increase torque supplied to the propeller is shown in FIGS. 2-4. As shown in FIG. 2, an engine 10 is provided in the rear end of a boat 12 adjacent its transom 14. A transmission 16 is interposed between engine 10 and a propeller 20, as is well known.

As shown in FIGS. 3 and 4, engine 10 generally includes a block 22 having a series of integrally formed cylinders, two of which are shown at 24 and 26. Cylinders 24, 26 are representative of other cylinders formed in line therewith. Cylinders 24, 26 are disposed in block 22 so as to be slanted in opposite directions with respect to each other to form a V-type engine, as is well known. Cylinders 24, 26 include mating pistons 28 and 30, respectively, which are connected by means of connecting rods to a crankshaft disposed at the apex of the V-shape, also as is known. A pair of cylinder heads 32, 34 are connected to block 22 adjacent the upper ends of cylinders 24, 26. Block 22 and cylinder heads 32, 34 form a V-configuration having a central valley.

Cylinders 24, 26 each have combustion chambers 36, 38 respectively, with spark plugs 40, 42 connected thereto, as is well known. Each cylinder is provided at its upper end with an intake port and an exhaust port adjacent its combustion chamber; as shown in FIG. 4, an exhaust port 44 is shown at the upper end of cylinder 24 adjacent combustion chamber 36, and an intake port 46 is shown at the upper end of cylinder 26 adjacent combustion chamber 38. A valve 48 seals exhaust port 44 from combustion chamber 36 during the intake, compression and firing sequences. Valve 48 is moved downwardly by a push rod and rocker arm combination, denoted generally at 50, at preselected intervals to exhaust the products of combustion from cylinder 24. Likewise, intake port 46 is sealed from combustion chamber 38 by a valve 52 during the compression, firing and exhaust sequences. Valve 52 is moved downwardly by a push rod and rocker arm combination, denoted generally at 54, at preselected intervals to permit an air-fuel mixture to flow into cylinder 26 for combustion by spark plug 42, as is well known.

In accordance with the invention, an exhaust manifold 56 is disposed in the valley of V-shaped engine 10. Exhaust manifold 56 has an exhaust collecting cavity 58. Passages are formed in the cylinder heads, such as passage 60 in cylinder head 32, to allow exhaust gases to pass from the cylinders through the cylinder heads to exhaust collecting cavity 58.

Exhaust manifold 56 further has a pair of fluid circulating cavities 62, 64, provided above and below exhaust collecting cavity 58. Fluid circulating cavities 62, 64 are part of the engine cooling system. As is well known, a fluid, such as water, is circulated through the engine cooling system to cool the various components of the engine. Cavities 62 and 64, being disposed on either side of exhaust collecting cavity 58, act to cool exhaust contained with cavity 58 by absorbing heat therefrom prior to the exhaust being discharged from engine 10.

With reference to FIG. 2, an exhaust discharge outlet 66 is provided at the rear end of exhaust manifold 56. Exhaust discharge outlet 66 is positioned so as to be in line with the valley of V-shaped engine 10. Exhaust discharge outlet 66 includes an exhaust path for passing exhaust gas first in an upward direction and then in a downward direction for delivery to the exhaust system of engine 10 for ultimate discharge from the boat.

Engine 10 of the present invention further includes an intake manifold 68. Intake manifold 68 is also disposed within the area defined by the valley of V-shaped engine 10, and is located adjacent and above exhaust manifold 56. Intake manifold 68 is provided with a central cavity 70 for receiving air to be mixed with fuel for supply to the cylinders. Any satisfactory means may be used to introduce air to cavity 70 of intake manifold 68.

As previously noted, fluid circulating through cavities 62, 64 absorbs heat from exhaust contained within exhaust cavity 58. Such heated fluid also acts to preheat air in cavity 70 of intake manifold 68. The pre-heating of the intake air in cavity 70 enhances engine performance at low-speed operation.

A series of induction pipes 72 extend between intake manifold 68 and the cylinder heads, such as 32, 34. Induction pipes 72 are connected at one end to intake manifold 68, and are in communication with cavity 70 of manifold 68. Induction pipes 72 allow air to pass from cavity 70 to supply passages formed in cylinder heads 32, 34, one of which is shown at 74. Fuel is introduced into the air entering cylinder 26 by any satisfactory method. For example, a carburetor of conventional construction may be mounted to the top of intake manifold 68 to provide an air-fuel mixture to cavity 70 of manifold 6. Alternatively, fuel may be injected into the air passing through induction pipes 72 at any satisfactory point in the air flow path, such as adjacent one of the bends in the pipes 72 or just prior to entry of the air into passage 74. In FIG. 2, the location of a carburetor mounting, flame arrestor, fuel distribution system or other such mechanism is denoted generally at 73.

Induction pipes 72 provide induction tuning to engine 10, which increases the supply of the air-fuel mixture to each cylinder. The induction tuning system of the present invention is advantageous in that the induction pipes 72 are all of the same length, thus ensuring that each cylinder receives the same amount of additional air-fuel mixture.

Induction tuning, using a series of pipes extending between an air collection mechanism and the intake port of each cylinder, is generally described in *The Scientific Design of Exhaust and Intake Systems* by Philip H. Smith. This text, at page 178, refers to a formula developed by the Chrysler Corporation to calculate the length of the intake tube as follows:

$$L = \frac{72C + 3}{N}$$

where
L=duct length (inches) from air intake to inlet valve;
N=RPM at which maximum torque is desired;
C=velocity of sound (feet per second) at expected pressure and temperature.

As noted, the induction tuning of engine 10 by mans of pipes 72 increases the amount of air-fuel mixture supplied to the cylinders. Such increase in the supply of air-fuel mixture available for combustion provides additional torque available for use by the propeller above and beyond that available without such a system. Using the above-noted formula, the appropriate length of induction pipes 72 can be determined so as to provide the additional torque in the appropriate range of engine speed to the right of curve A in FIG. 1 to enhance boat performance.

It can thus be seen that the present invention provides an engine capable of delivering increased torque at certain engine speeds as well as compact packaging for such an engine. The compact packaging of an engine is especially advantageous in marine applications, where space available in the interior of the boat is at a premium. As shown in FIG. 3, the dashed lines represent the location of the air intake and exhaust manifolds in the conventional V-type marine engine. As can be seen, the packaging of the marine engine of the invention is substantially narrower and less bulky than prior packaging. Further, the compactness of the marine engine is desirable when two engines are placed side-by-side in the rear of a boat. In such an installation, it is advantageous to place the engines as close together as possible so as to allow the dual propellers to likewise be as close together as possible. Such placement of the propellers lessens the likelihood that one propeller will come out of the water when making a sharp turn. This can occur in present systems where the propellers in dual engine applications are farther apart than is possible with side-by-side engines constructed according to the present invention.

It is recognized that various alternatives and modifications are contemplated as being within the scope of the following claims particularly pointing out and distinctly claiming the invention.

I claim:

1. A four-stroke cycle V-engine, comprising:
a pair of cylinder banks each having a plurality of cylinders, said cylinder banks being slanted with respect to each other to form a V-engine configuration, said cylinder banks lying along and defining two nonparallel planes forming the V, said cylinders being defined by a head and cylindrical sidewalls, said cylinders each having an intake port for receiving an air-fuel mixture and an exhaust port for allowing exhaust to pass from said cylinders; and
supply means for furnishing said air-fuel mixture to said intake ports from outside the valley of said V-engine, said supply means extending through both said planes.

2. The invention according to claim 1, wherein exhaust passes from said exhaust ports toward the valley of said V-engine.

3. The invention according to claim 2, wherein an exhaust passage is disposed adjacent the upper end of each of said cylinder for passing said exhaust from said exhaust ports toward the valley of said V-engine.

4. The invention according to claim 3, further comprising an exhaust collecting means disposed in the valley of said V-engine, said exhaust collection means being in communication with said exhaust passages.

5. The invention according to claim 4, wherein said exhaust collection means comprises an exhaust manifold having a single exhaust discharge outlet.

6. The invention according to claim 1, wherein said supply means for furnishing said air-fuel mixture to said plurality of cylinders comprises a plurality of induction tubes.

7. The invention according to claim 6, wherein said induction tubes are connected at one end to an intake manifold disposed in the valley of said V-engine.

8. The invention according to claim 7, wherein said intake manifold is located adjacent an exhaust manifold disposed in the valley of said V-engine.

9. The invention according to claim 8, wherein said intake manifold and said exhaust manifold are integrally formed.

10. The invention according to claim 8, further comprising fluid circulating cooling means disposed adjacent said exhaust manifold for absorbing heat from exhaust contained therein, and wherein heat is transferred from fluid in said fluid circulating cooling means to air in said intake manifold prior to passing through said induction tubes to said intake ports of said cylinders.

11. The invention according to claim 6, wherein said induction pipes boost the torque output of said engine by means of induction tuning.

12. In a V-type four-stroke cycle engine having a plurality of cylinders disposed in a pair of oppositely slanted cylinder banks to form a V-engine configuration, said cylinder banks lying along and defining two non-parallel planes forming the V, said cylinders being defined by a head and cylindrical sidewalls, said cylinders each having an intake port for allowing an air-fuel mixture to be introduced into said cylinders and an exhaust port for allowing exhaust to pass from said cylinders, the improvement comprising:
exhaust collection means disposed in the valley of said V-shaped engine for collecting exhaust passing from said cylinders through said exhaust ports;
exhaust discharge means connected to said exhaust collection means for discharging said exhaust from said exhaust collection means; and
intake means for introducing said air-fuel mixture to said intake ports from outside the valley of said V-engine, said intake means extending through both said planes.

13. The invention according to claim 12, wherein said exhaust collection means comprises an exhaust manifold disposed in the valley of said V-engine, said exhaust manifold being provided with an exhaust collection cavity for receiving said exhaust passing from said cylinders through said exhaust ports.

14. The invention according to claim 13, wherein said exhaust discharge means comprises an exhaust outlet leading from said exhaust collection cavity, said exhaust outlet being disposed adjacent an end of said exhaust manifold and being positioned in line with the valley of said V-engine.

15. The invention according to claim 14, wherein said exhaust outlet is disposed adjacent the rear of said V-engine.

16. The invention according to claim 12, wherein said intake means comprises a plurality of induction tubes for supplying said air-fuel mixture to said intake ports.

17. The invention according to claim 16, wherein said induction tubes are connected at one end to said V-engine outside the valley thereof for passing said air-fuel mixture to said intake ports, and are connected at the other end to an intake manifold disposed in the valley of said V-engine.

18. The invention according to claim 12, wherein said intake means comprises an air intake manifold disposed in the valley of said V-engine and air passage means extending from said air intake manifold and connected to said V-engine outside the valley thereof for introducing air to said intake ports therefrom, and wherein said air intake manifold and said exhaust collection means are disposed adjacent each other in the valley of said V-engine.

19. The invention according to claim 18, wherein air in said air intake manifold is heated by said exhaust in said exhaust collection means prior to said air passing through said air passage means to said intake ports.

20. The invention according to claim 19, further comprising fluid circulating cooling means disposed adjacent said exhaust collection means for cooling exhaust contained within said exhaust collection means by absorbing heat therefrom, and wherein air contained with said air intake manifold is heated by fluid contained within said fluid circulating cooling means prior to said air passing through said air passage means to said intake ports for introduction into said cylinders.

* * * * *